(12) United States Patent
Teramura et al.

(10) Patent No.: US 8,078,352 B2
(45) Date of Patent: Dec. 13, 2011

(54) ELECTRONIC CONTROL UNIT FOR VEHICLE

(75) Inventors: Mikio Teramura, Okazaki (JP); Takeo Umesaka, Gifu (JP); Takeshi Suganuma, Kariya (JP)

(73) Assignee: Denso Corporation, Kariya (JP)

( * ) Notice: Subject to any disclaimer, the term of this patent is extended or adjusted under 35 U.S.C. 154(b) by 413 days.

(21) Appl. No.: 12/428,740

(22) Filed: Apr. 23, 2009

(65) Prior Publication Data

US 2009/0271051 A1      Oct. 29, 2009

(30) Foreign Application Priority Data

Apr. 25, 2008   (JP) .................................. 2008-115496

(51) Int. Cl.
*G01M 7/00* (2006.01)
(52) U.S. Cl. ........................................................ 701/29
(58) Field of Classification Search .................... 701/29, 701/32

See application file for complete search history.

(56) References Cited

U.S. PATENT DOCUMENTS 6,799,106 B2 * 9/2004 Fukushima et al. ............ 701/48

FOREIGN PATENT DOCUMENTS

| JP | 2001-301572 | 10/2001 |
| JP | 2004-136701 | 5/2004 |
| JP | 2004-142511 | 5/2004 |

OTHER PUBLICATIONS (OBD II) Title 13, California Code Regulations, Section 1968.2, Malfunction and Diagnostic System Requirements for 2004 and Subsequent Model-Year Passenger Cars, Light-Duty Trucks and Medium-Duty Vehicles and Engines, pp. i-iii and pp. 1-143 (No Date).

* cited by examiner

*Primary Examiner* — Paul N Dickson
*Assistant Examiner* — Robert A Coker
(74) *Attorney, Agent, or Firm* — Nixon & Vanderhye P.C.

(57) ABSTRACT

An electronic control unit (ECU) for a vehicle is disclosed. The subject ECU stores: vehicle ID; and first cross-check information different from the vehicle ID. The subject ECU acquires second cross-check information different from the vehicle ID. The second cross-check information is stored in an external ECU that is mounted in a same vehicle as the subject ECU is mounted. The subject ECU determines whether the first cross-check information matches the second cross-check information. Upon receiving an instruction for changing the vehicle ID, the subject ECU prohibits a change the vehicle ID if the first cross-check information matches the second cross-check information, and the subject ECU changes the vehicle ID if the first cross-check information does not match the second cross-check information.

7 Claims, 4 Drawing Sheets

ELECTRONIC CONTROL UNIT FOR VEHICLE

CROSS REFERENCE TO RELATED APPLICATION

The present application is based on Japanese Patent Application No. 2008-115496 filed on Apr. 25, 2008, the disclosure of which is incorporated herein by reference.

BACKGROUND OF THE INVENTION

1. Field of the Invention

The present invention relates to an electronic control unit (ECU) for a vehicle, and more particularly relates an ECU that manages a change of vehicle identification information.

2. Description of Related Art

A modern vehicle is equipped with multiple electronic control units (ECUs) for controlling parts of the vehicle. As described in JP-A-2001-301572 for example, an engine ECU, which is one of the ECUs, stores a vehicle identification number (VIN) in a memory thereof such as an EEPROM or the like. The VIN is unique on a vehicle-by-vehicle basis and can function as vehicle identification information. In addition to the VIN, the engine ECU stores immobilizer identification information (e.g., immobilizer ID), various types of malfunction information, learning data for vehicle control and the like in the memory.

When an ECU that stores a VIN is detached from one vehicle and re-mounted in a different vehicle, it is necessary to change the VIN to one that is proper to the different vehicle.

However, when a change of a VIN stored in an ECU is freely permitted upon reception of an instruction for changing the original VIN, a disadvantage arises. For example, even when an ECU is mounted in one vehicle and is not re-mounted in a different vehicle, it is possible change the stored VIN to a different one that does not meet the one vehicle. Since VINs are used to uniquely identify vehicles, the above-described disadvantage can lead to, for example, an improper change of a VIN.

SUMMARY OF THE INVENTION

In view of the above and other difficulties, it is an objective of the present invention to provide an electronic control unit (ECU) configured to determine whether vehicle identification information is to be changed or not to be changed.

According to a first aspect of the present invention, an electronic control unit for a vehicle is provided. The electronic control unit includes: a vehicle identification information storing part that stores therein vehicle identification information, which is unique on a vehicle-by-vehicle basis; a first cross-check information storing part that stores therein first cross-check information, which is unique on the vehicle-by-vehicle basis and different from the vehicle identification information; a second cross-check information acquisition section that acquires second cross-check information, which is unique on the vehicle-by-vehicle basis, different from the vehicle identification information and stored in an external electronic control unit that is mounted in a same vehicle as the subject electronic control unit is mounted in; a cross-check information determination section that determines whether the first cross-check information matches the second cross-check information; and a stored information management section that manages a change of the vehicle identification information stored in the vehicle identification information storing part upon receiving an instruction for changing the vehicle identification information, such that: the stored information management section prohibits the change of the vehicle identification information when the cross-check information determination section determines that the first cross-check information matches the second cross-check information; and the stored information management section changes the vehicle identification information when the cross-check information determination section determines that the first cross-check information does not match the second cross-check information.

According to the above electronic control unit, when the first cross-check information is determined to match the second cross-check information, the subject ECU can determines that the subject ECU stores therein the vehicle identification information that is proper and unique to a vehicle to which the subject ECU is presently mounted. In such a case, the subject ECU prohibits the change of the vehicle identification information even if receiving the instruction for changing the vehicle identification information, and thereby it is possible to prevent an improper change of the vehicle identification information stored in the subject ECU. On the other hand, when the first cross-check information is determined not to match the second cross-check information, the subject ECU can determines that the subject ECU is dethatched from one vehicle and re-mounted in a different vehicle. In such a case, the subject ECU changes the vehicle identification information upon receiving the instruction for changing the vehicle identification information, and thereby it is possible change the vehicle identification information into one that is proper and unique to the different vehicle to which the subject ECU is presently mounted.

According to a second aspect of the present invention, an electronic control unit for a vehicle is provided. The electronic control unit includes: a first vehicle identification information storing part that stores therein first vehicle identification information, which is unique on a vehicle-by-vehicle basis; a second vehicle identification information acquisition section that acquires second vehicle identification information, which is unique on the vehicle-by-vehicle basis and stored in an external electronic control unit that is mounted in a same vehicle as the subject electronic control unit is mounted in; a vehicle identification information determination section that determines whether the first vehicle identification information matches the second vehicle identification information; and a stored information management section that manages a change of the first vehicle identification information stored in the first vehicle identification information storing part upon receiving an instruction for changing the first vehicle identification information, such that: the stored information management section prohibits the change of the first vehicle identification information when the vehicle identification information determination section determines that the first vehicle identification information matches the second vehicle identification information; and the stored information management section changes the first vehicle identification information when the vehicle identification information determination section determines that the first vehicle identification information does not match the second vehicle identification information.

According to the above electronic control unit, when the first vehicle identification information is determined to match the second vehicle identification information, the subject ECU can determines that the subject ECU stores therein the first vehicle identification information that is proper and unique to a vehicle to which the subject ECU is presently mounted. In such a case, the subject ECU prohibits the change of the first vehicle identification information even if receiving the instruction for changing the first vehicle identification information, and thereby it is possible to prevent an improper change of the first vehicle identification information stored in the subject ECU. On the other hand, when the first vehicle identification information is determined not to match the second vehicle identification information, the subject ECU can determines that the subject ECU is dethatched from one vehicle and re-mounted in a different vehicle. In such a case, the subject ECU changes the first vehicle identification information upon receiving the instruction for changing the first vehicle identification information, and thereby it is possible change the first vehicle identification information into one that is proper and unique to the different vehicle to which the subject ECU is presently mounted.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary embodiments are described below with reference to the accompanying drawings.

First Embodiment

Figure 1:
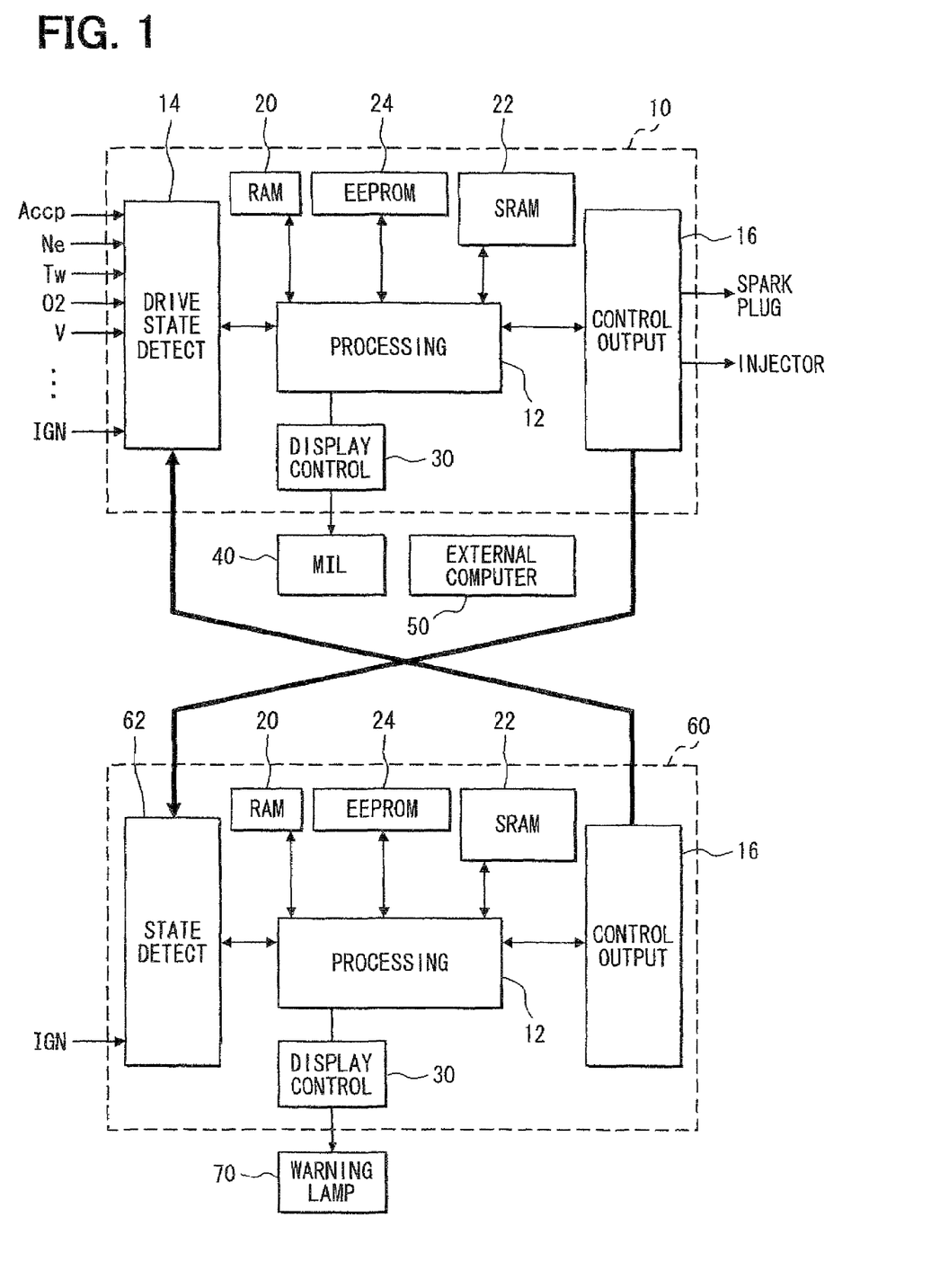
FIG. 1 is a block diagram illustrating a vehicle control system according to a first embodiment.

FIG. 1 is a block diagram illustrating a vehicle control system according to a first embodiment. The vehicle control system includes an engine ECU 10 and an immobilizer ECU 60. The engine ECU 10 and the immobilizer 60 are connected via a a Controller Area Network (CAN) and can transmit data to each other and to other devices on the CAN. The engine ECU 10 can function as a subject electronic control unit and the immobilizer ECU 60 can function as an external electronic control unit.

The engine ECU 10 includes an I/O circuit, a microcomputer, a peripheral circuit for the microcomputer, a terminal such as an I/O connector for external connection, a case or housing, and a support member. The engine ECU 10 is disposed in a vehicle compartment or an engine compartment. The engine ECU 10 has a processing part 12, a driving state detection part 14, a control output part 16, a random access memory (RAM) 20, a standby or static RAM (SRAM) 22, an electrically programmable read only memory (EEPROM) 24, and a display control part 30. The engine ECU 10 controls parts of a vehicle so that an engine can operate in a target driving state.

The processing part 12 includes a CPU, a timer and a ROM as hardware. The processing part 12 can function as a data computation section that performs computation based on data associated with various types of sensors and controls the parts of the vehicle via the control output part 16, so that the engine can operate in a target driving state. The data associated with the various types of sensors is acquired from the driving state detection part 14. Further, the processing part 12 can function as a self-diagnosis section that performs a failure diagnosis of parts of the vehicle.

The driving state detection part 14 acquires information indicative of a vehicle driving state from various types of sensors. The information indicative of the vehicle driving state is associated with an accelerator position value ACCP, an engine revolution value Ne, a water temperature Tw, an oxygen level $O_2$, an intake air amount V, an ignition signal IGN and the like. The driving state detection part 14 further acquires various types of information from the immobilizer ECU via the CAN.

The control output part 16 outputs control signals to parts of the vehicle, such as a spark plug and an injector, in accordance with instruction signals from the processing part 12, so that the engine can operate in a target operating state. Further, the control output part 16 outputs various types of information to a state detection part 62 of the immobilizer ECU 60 via the CAN.

The RAM 20 can temporally store data, including data of a computation result of the processing part 12 for instance. The SRAM 22 is also called a backup RAM and may be a volatile memory. To the SRAM 22, a voltage is continuously applied from a battery of the vehicle even when an ignition key is in OFF. The EEPROM 24 is a non-volatile memory.

When a malfunction of a part of the vehicle is detected, the processing part 12 stores a Diagnostic Trouble Code (DTC) indicative of a malfunction in the SRAM 22 or the EEPROM 24. For example, the processing part 12 stores a DTC including malfunction information associated with an emission system in the SRAM 22, and then, the processing part 12 records a part of the DTC as a Permanent Fault Code in the EEPROM 24 before an ignition cycle ends. In the above, the part of the DTC corresponds to or is identical to a predetermined DTC, and the ignition cycle corresponds to a period between a time when an ignition switch of the vehicle is turned on and a time when the ignition switch is turned off. Hereinafter, the Permanent Fault Code is also referred to as a Permanent DTC. In California Air Resources Board (CARB) regulations, it is suggested that a DTC containing a diagnostic result should be stored as a Permanent DTC in a non-volatile memory such as an EEPROM for instance. In the above description, the malfunction information associated with an emission system may include malfunction information about sensors required for emission control. Such sensors are for example a water temperature sensor and an intake air amount sensor. The malfunction information associated with an emission system is also referred to herein as emission system malfunction information.

The EEPROM 24 stores therein information that is uniquely assigned on a vehicle-by-vehicle basis. For example, the EEPROM 24 stores: a VIN functioning as vehicle identification information; immobilizer identification information (e.g., immobilizer ID) functioning as first cross-check information; and learning data for vehicle control. The learning data for vehicle control includes data of an injection amount characteristic of an injector, an opening characteristic of a throttle valve and the like. It should be noted that, according to regulations, the VIN and the PDTC are required to be stored in a non-volatile memory.

In the present embodiment, the EEPROM 24 can function as a vehicle identification information storing means or part, and a cross-check information storing means or part. The EEPROM 24 or the SRAM 22 can function as a malfunction information storing means or part.

The display control part 30 controls display of a malfunction indicator lamp (MIL) 40. An external computer 50, which serves as an example of an external apparatus, is connected and communicable with the engine ECU 10 via an I/O interface (not shown). Thereby, the external computer 50 can read information, such as a malfunction code, from the SRAM 22 or the EEPROM 24 of the engine ECU 10 and can instruct the engine ECU 10 to change the information stored in the SRAM 22 or the EEPROM 24.

In the present embodiment, the immobilizer ECU 60 has a microcomputer and has a configuration generally similar to that of engine ECU 10. Between the engine ECU 10 and the immobilizer ECU 60, like parts are referred using like reference numerals.

A control output part 16 of the immobilizer ECU 60 transmits various types of information to the driving state detection part 14 of the engine ECU 10. The immobilizer ID is stored as second cross-check information in the EEPROM 24 of the immobilizer ECU 60. The immobilizer ECU 60 determines whether an immobilizer ID that is acquired from an ignition key by using the state detection part 62 matches the immobilizer ID that is stored in the EEPROM 24 of the immobilizer ECU 60. When it is determined that the immobilizer ID acquired from the ignition key matches the immobilizer ID stored in the EEPROM 24, the immobilize ECU 60 determines that authentication is successful. When it is determined that the immobilizer ID acquired from the ignition key does not match the immobilizer ID stored in the EEPROM 24, the immobilize ECU 60 determines that the authentication is un-successful. The immobilizer ECU 60 encrypts a result of the above-described determination of whether the acquired immobilizer ID match the stored immobilizer ID, and transmits the encrypted result to the engine ECU 10 in response to an inquiry from the engine ECU 10. The engine ECU 10 acquires the immobilizer ID stored in the EEPROM 24 of the immobilizer ECU 60 in addition to the result of the determination made by the immobilizer ECU 60.

When the immobilizer ECU 60 determines that the authentication is un-successful, the engine ECU 10 prevents the engine from starting. Even when the immobilizer ECU 60 determines that the authentication is successful, if the engine ECU 10 determines that the immobilizer ID stored in the EEPROM 24 of the engine ECU 10 does not match the immobilizer ID stored in the EEPROM 24 of the immobilizer ECU 60, the engine ECU 10 prevents the engine from starting. The engine ECU 10 permits the engine to start when the result of the determination made by the immobilizer ECU 60 indicates that the authentication is successful and when the immobilizer ID stored in the EEPROM 24 of the engine ECU 10 matches the immobilizer ID stored in the EEPROM 24 of the immobilizer ECU 60.

The display control part 30 of the immobilizer ECU 60 controls display of a warning lamp 70 associated with the immobilizer.

Description is given below to a control program which is stored in the ROM to cause the engine ECU 10 or the processing part 12 of the engine ECU 10 to function as a cross-check information acquisition means or section, a cross-check information determination means or section, and a stored information management means or section.

(Cross-Check Information Acquisition Section)

When the stored information management section receives an instruction for changing the VIN, the engine ECU 10 issues a request for the immobilizer ECU 60 (see FIG. 2) or an immobilizer ECU 210 (see FIG. 3) to transmit an immobilizer ID, and the engine ECU 10 receives the immobilizer ID from the immobilizer ECU 60 or 210. In the above, the immobilizer ECU 60 or 210 and the engine ECU 10 are mounted in the same vehicle.

(Cross-Check Information Determination Section)

Figure 2A:
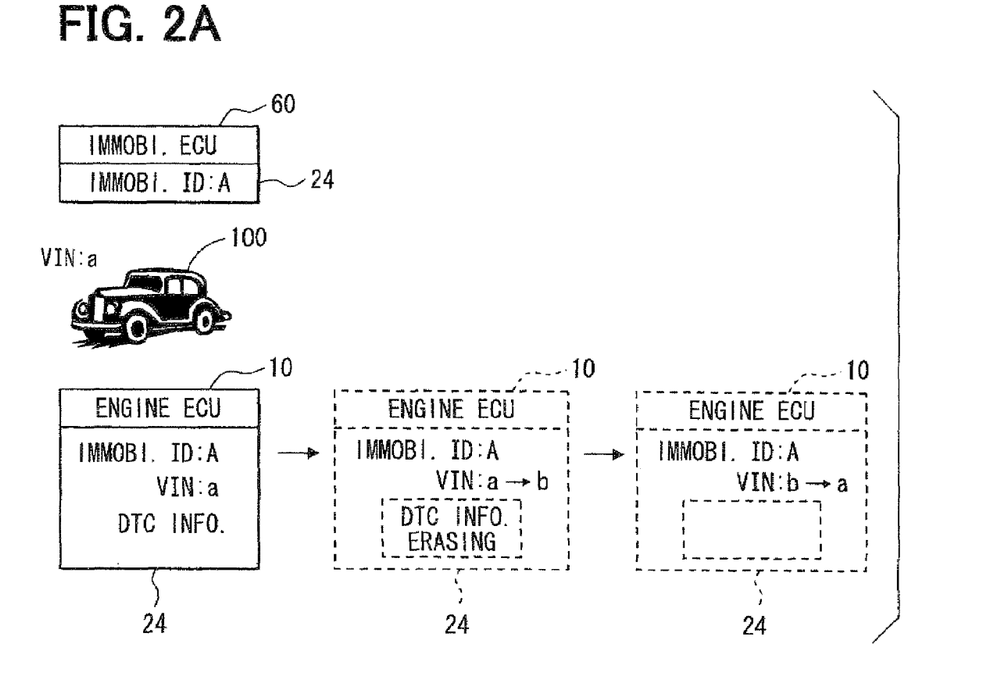
FIGS. 2A and 2B are diagrams each associated with changing a VIN according to a first embodiment.

The engine ECU 10 determines whether the immobilizer ID stored in the engine ECU 10 matches the immobilizer ID acquired from the immobilizer ECU 60 or 210.

The immobilizer ID can function as cross-check information unique to a vehicle to which an immobilizer is mounted. Thus, the stored information management section can determine whether the VIN should be changed based on the existing immobilizer IDs without the need to newly assigning different cross-check information that is unique on a vehicle-by-vehicle basis and different from the VIN.

As shown in FIG. 3 for instance, when an engine ECU 10 that stores a VIN "a" and an immobilizer ID "A" has been detached from a vehicle 100 and re-mounted in a different vehicle 200, the immobilizer ID "A" stored in the engine ECU 10 should not match an immobilizer ID "B" stored in an immobilizer ECU 210, which is originally mounted in the vehicle 200. The vehicle 200 is prevented from being started due to the mismatch between the immobilizer ID "A" and the immobilizer ID "B", which respectively stored in the engine ECU 10 and the immobilizer ECU 210 mounted in the same vehicle 200. Thereby, it becomes possible to prevent the vehicle 200 from staring until the immobilizer ID "A" stored in the engine ECU 10 is changed into the immobilizer ID "B" that meets the vehicle 200.

(Stored Information Management Section)

The engine ECU 10 receives from the external computer 50 an instruction for changing the VIN, which is one type of information that is unique on a vehicle-by-vehicle basis and is stored in the engine ECU 10.

Figure 2B:
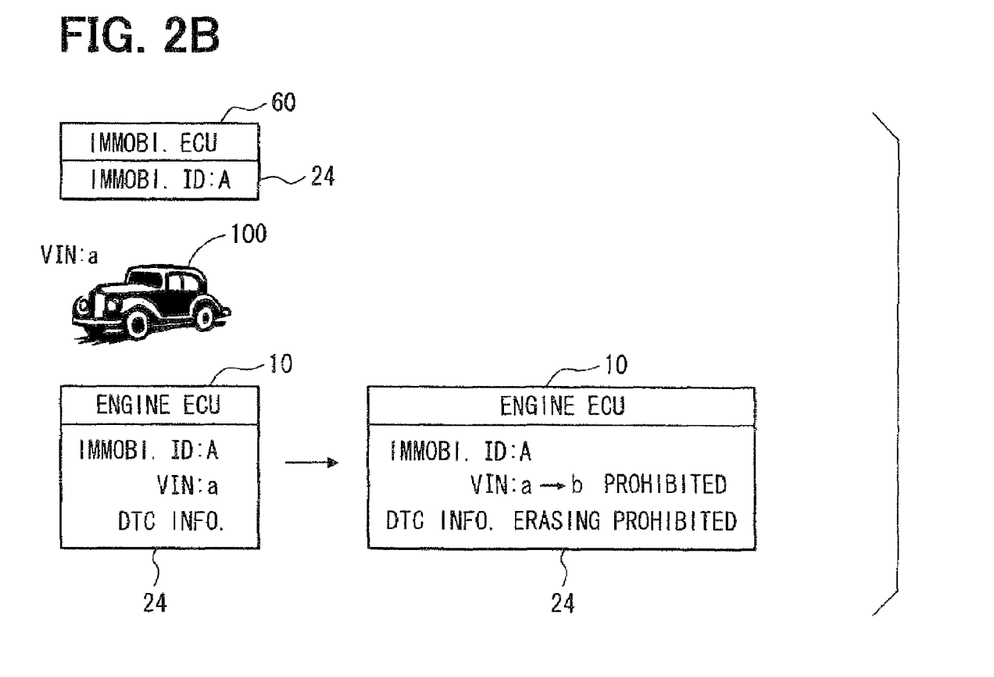
Figure 3:
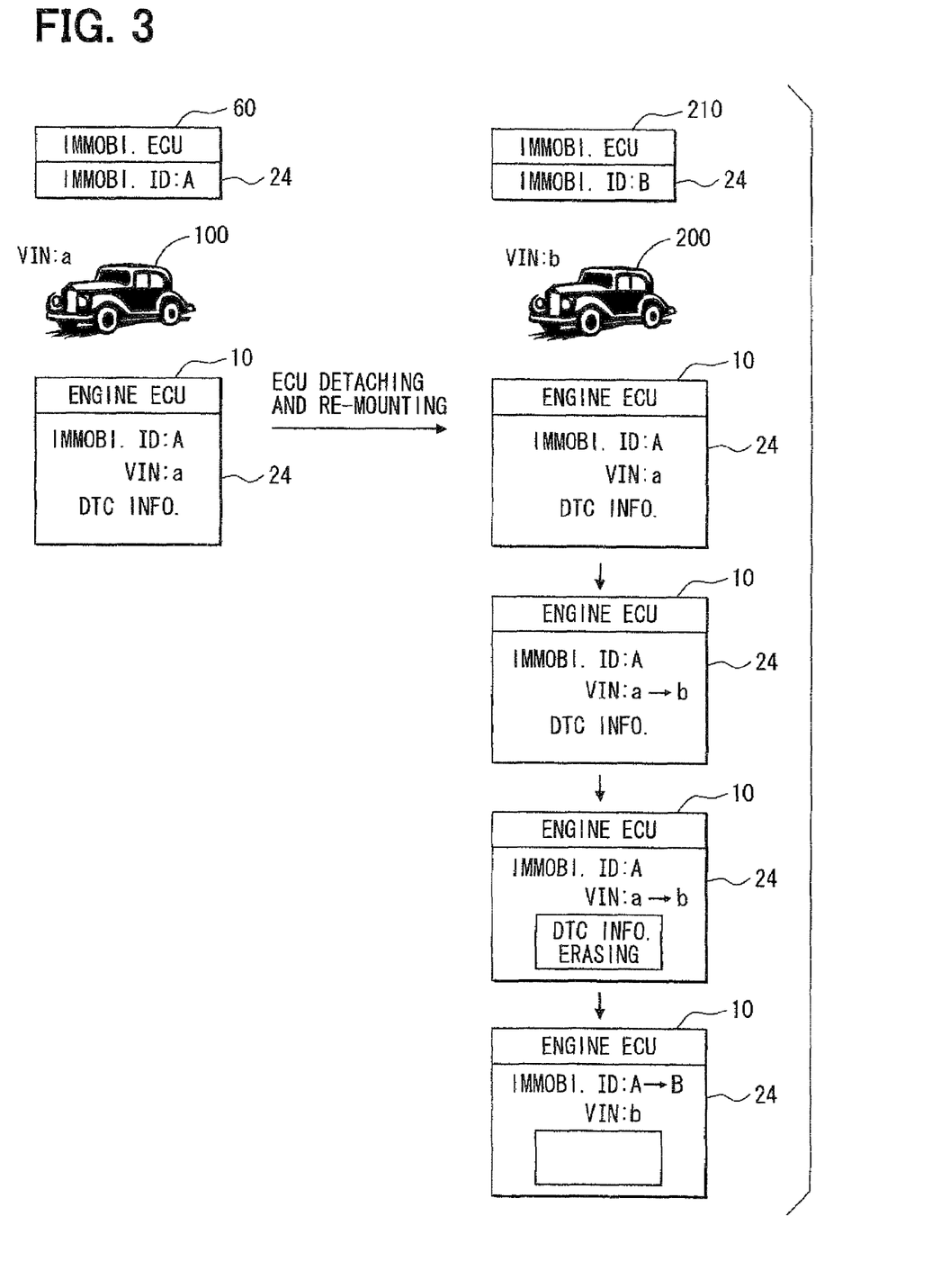
FIG. 3 is a diagram associated with detaching an ECU from one vehicle and re-mounting the ECU to a different vehicle.

For example, as shown in FIG. 2B, there may be a case where the external computer 50 instructs the engine ECU 10 to change a VIN "a" stored therein into a different VIN "b" that matches a vehicle different from the vehicle 100 to which the engine ECU 10 is presently mounted.

Alternatively, as shown in FIG. 3, there may be a case where the engine ECU 10 is detached from the vehicle 100 and re-mounted in a different vehicle 200. Further, the external computer 50 may instruct the engine ECU 10 to change the VIN "a" stored therein into the VIN "b" that matches the vehicle 200 to which the engine ECU 10 is presently re-mounted.

When the engine ECU 10 receives the instruction for changing the VIN, if the immobilizer ID stored in the engine ECU 10 matches the immobilizer ID acquired from the immobilizer ECU 60 or 210, the engine ECU 10 prohibits a change of the VIN.

When the engine ECU 10 receives the instruction for changing the VIN, if the immobilizer ID stored in the engine ECU 10 does not match the immobilizer ID acquired from the immobilizer ECU 60 or 210, the engine ECU 10 changes the VIN.

As a comparison example shown in FIG. 2A, it is assumed that the engine ECU 10 can freely permit a change of the VIN in response to reception of the instruction for changing the VIN even if the immobilizer ID stored in the engine ECU 10 matches the immobilizer ID acquired from the immobilizer ECU 60 or 210. Following the above assumption, the engine ECU 10 can change the VIN "a" into the VIN "b" and can automatically erase the DTC and the PDTC, which contain the malfunction information associated with the emission system, from the SRAM 22 and the EEPROM 24. Further, the VIN "b" can be then changed into the VIN "a" again upon reception of the instruction for changing the VIN after the malfunction information associated with the emission system is erased from the SRAM 22 and the EEPROM 24. In the above case, it appears that the malfunction information associated with the emission system is erased without changing the VIN "a". Thus, the free permission to change the VIN may enable an improper erasure of the malfunction information associated with the emission system.

The present embodiment can address the above difficulty. According to the present embodiment, when the engine ECU mounted in the vehicle 100 receives the instruction for changing the VIN, the cross-check information acquisition section of the engine ECU 10 acquires the immobilizer ID stored in the immobilizer ECU 60, which is also mounted in the vehicle 100.

In the vehicle 100, since the immobilizer ID "A" stored in the engine ECU 10 matches the immobilizer ID "A" stored in the immobilizer ECU 60, the engine ECU 10 prohibits a change of the VIN "a" stored in the engine ECU 10. Further, since the engine ECU 10 prohibits the change of the VIN "a" stored in the engine ECU 10, the engine ECU 10 cannot erase the malfunction information associated with the emission system from the SRAM 22 and the EEPROM 24.

When the engine ECU 10 is detached from the vehicle 100 and re-mounted in the different vehicle 200 as exemplified in FIG. 3, it is necessary to change the VIN "a" stored in the engine ECU 10 into a different VIN "b" that matches the vehicle 200 to which the engine ECU 10 is presently mounted.

Accordingly, upon receiving the instruction for changing the VIN, the engine ECU 10 acquires immobilizer ID "B" via the cross-check information acquisition section. In the above, the immobilizer ID "B" is stored in an immobilizer ECU 210, and the immobilizer ECU 210 and the engine ECU 10 are mounted in the same vehicle 200.

In the above case, since the immobilizer ID "A" stored in the engine ECU 10 does not match the immobilizer ID "B" stored in the immobilizer ECU 210, the engine ECU 10 can change the VIN "a" into the VIN "b".

Along with the change of the VIN "a" into the VIN "b", the engine ECU 10 can erase the malfunction information associated with the emission system from the SRAM 22 and the EEPROM 24. Further, along with the change of the VIN "a" into the VIN "b", the engine ECU 10 can change the immobilizer ID "A" into the immobilizer "B" and also may change various types of learning data for vehicle control into initial values which may correspond to averaged values taking into account variation between vehicles. Alternatively, the learning data may not be changed into the initial values but may be changed into or set to predetermined values or other values determined according to a predetermined rule.

When the engine ECU 10 receives the instruction for changing the VIN from the external computer 50, the engine ECU 10 may, while not communicating with the external computer 50, (i) acquire the immobilizer ID stored in the immobilizer ECU mounted in the vehicle to which the engine ECU 10 is presently mounted, (ii) determine whether the immobilizer ID stored in the engine ECU 10 matches the immobilizer ID stored in the immobilizer ECU, and (iii) automatically manage a change of the VIN, the malfunction information associated with the emission system, the immobilizer ID and the learning data. Alternatively, the engine ECU 10 may (i) automatically acquire of various types of information, (ii) determine whether IDs match each other, and (iii) manage the change, while the engine ECU 10 is communicating with the external computer 50 and is not accepting intervention by an operator of the external computer 50.

According to the above manners, when the engine ECU 10 receives the instruction for changing the "VIN" from the external computer 50, the engine ECU 10 automatically change or does not change the VIN, the malfunction information associated with the emission system, the immobilizer ID and the learning data regardless of whether the engine ECU 10 is communicating or is not communicating with the external computer 50. It is therefore possible to reduce man-hours for changing the stored information which is unique to each vehicle.

When the engine ECU 10 is detached and re-mounted in a different vehicle 200 as shown in FIG. 3, if the engine ECU 10 fails to re-write the VIN to the EEPROM 24 due to a failure of the EEPROM 24, the engine ECU 10 may stop attempting a change of other information and may transmit notification indicative of the failure of the VIN change to the external computer 50. According to the above manners, since the change of stored information other than the VIN is stopped, it is possible to prevent the stored information other than the VIN from being changed into improper values.

Further, when the engine ECU 10 receives an instruction for changing the immobilizer ID before receiving the instruction for changing the VIN, the engine ECU 10 prohibits a change of the immobilizer ID if the immobilizer ID stored in the engine ECU 10 matches the immobilizer ID stored in the immobilizer ECU 60 or 210 mounted in the vehicle as the engine ECU 10 is mounted in. Herein, the immobilizer ID stored in the engine ECU 10 function as first cross-check information and the immobilizer ID stored in the immobilizer ECU 60 or 210 can function as second cross-check information.

Accordingly, when the immobilizer IDs match each other, the changing of the immobilizer ID stored in the engine ECU 10 prior to the reception of the instruction for changing the VIN can be prevented. As a result, when the immobilizer IDs match each other, it is possible to not only prohibit a change of the VIN but also prevent an such a change that: in a state where the engine ECU 10 is not detached from and still mounted in the vehicle to which the engine ECU 10 is originally mounted, the immobilizer ID stored in the engine ECU 10 is changed into a different immobilizer ID, and then the VIN is changed into a different VIN.

(Change Control Procedure)

Figure 4:
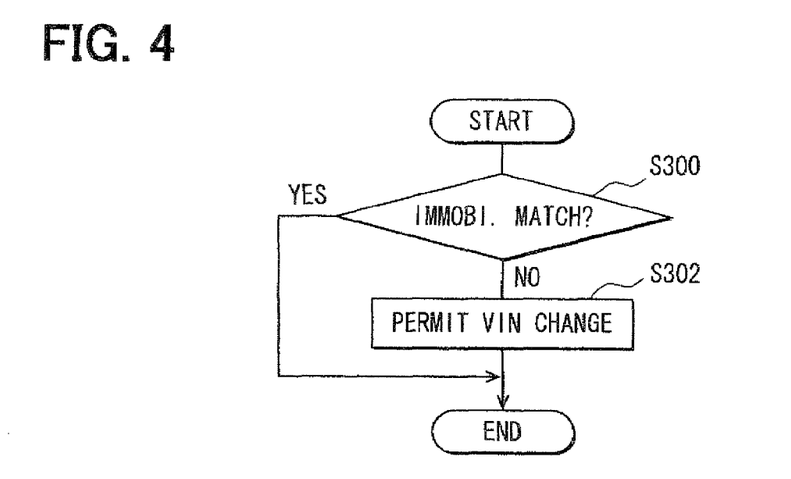
FIG. 4 is a flow chart of a change control procedure.

Referring to FIG. 4, explanation is given on a change control procedure, which can be performed by the processing part 12 of the engine ECU 10 when the engine ECU 10 receives the instruction for changing the VIN. The engine ECU 10 executes a procedure exemplified in a flow chart in FIG. 4, when the engine ECU 10 accepts the instruction for changing the VIN from the external computer 50. In the above described situation, the acceptance may correspond to reception of the instruction for changing the VIN and subsequent recognition of the reception. Further, the engine ECU 10 may or may not issue reception notification for notifying the external computer 50 of the acceptance. In FIG. 4, "S" denotes a step in the change control procedure.

When the engine ECU 10 receives the instruction for changing the VIN from the external computer 50, the engine ECU 10 requests at S300 the immobilizer ECU to transmit the immobilizer ID and acquires the transmitted immobilizer ID. Further, the engine ECU 10 determines at S300 whether the immobilizer ID stored in the EEPROM 24 of the engine ECU 10 matches the immobilizer ID stored in the immobilizer ECU. At S300, the immobilizer ECU and the engine ECU are mounted in the same vehicle.

When it is determined that the immobilizer IDs match each other, corresponding to "YES" at S300, the engine ECU 10 prohibits the change of the VIN, and then the change control procedure is ended. When it is determined that the immobilizer IDs do not match each other, corresponding to "NO" at S300, process proceeds to S302. At S302, the engine ECU 10 changes the VIN stored in the EEPROM 24 into a different VIN based on an instruction from the external computer 50. When the engine ECU 10 is set to return the reception notification to the external computer 50, the external computer 50 may transmit a signal containing information about a new VIN after receiving the reception notification. Alternatively, the external computer 50 may transmit the signal containing information about the new VIN together with the instruction for changing the VIN.

At S302, the engine ECU 10 changes the immobilizer ID stored in the EEPROM 24 of the engine ECU 10 in addition to the VIN by acquiring new immobilizer ID from the immobilizer ECU that is mounted in the same vehicle as the engine ECU 10 is mounted in. Further, the engine ECU 10 erases the malfunction information associated with the emission system and changes the learning data into, for example, initial values.

Second Embodiment

Figure 5:
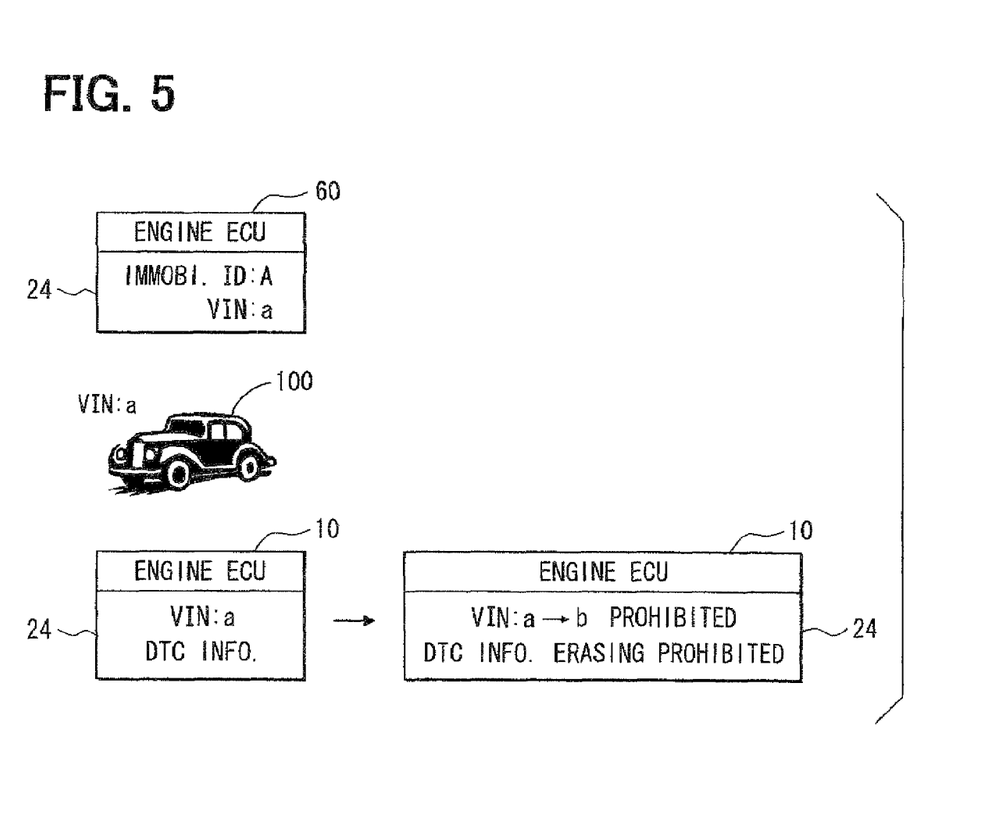
FIG. 5 is a diagram associated with a change of a VIN according to a second embodiment.

FIG. 5 is a diagram associated with a change of the VIN according to a second embodiment. Between the first and second embodiment, like parts refer to like reference numeral.

In the second embodiment, the immobilizer ECU 60 stores the VIN in addition to the immobilizer ID. When the engine ECU 10 receives the instruction for changing the VIN, the engine ECU 10 acquires the VIN stored in the immobilizer ECU 60, which is mounted in the same vehicle as the engine ECU 10 is mounted. Then, the engine ECU 10 compares the VIN "a" stored in the engine ECU 10 to the VIN "a" stored in the immobilizer ECU 60.

As shown in FIG. 5, when it is determined that the VIN "a" stored in the engine ECU 10 matches the VIN "a" stored in the immobilizer ECU 60, the engine ECU 10 prohibits the change of the VIN and the erasure of the malfunction information associated with the emission system such as the DTC, the PDTC and the like.

When the engine ECU 10 is detached from the vehicle 100 and re-mounted in a different vehicle, the VIN "a" stored in the engine ECU 10 should not match the VIN stored in the immobilizer ECU that is originally mounted in the different vehicle. In the above case, the engine ECU 10 can change the VIN, the malfunction information associated with the emission system, the immobilizer ID and the learning data, based on the instruction for changing the VIN.

In the present embodiment, the engine ECU 10 or the processing part 12 of the engine ECU 10 can function as a vehicle identification information acquisition means or section, and a vehicle identification information determination means or section.

In the above embodiments, each of the engine ECU 10 and the immobilizer ECU has vehicle identification information unique on the vehicle-by-vehicle basis, such as the immobilizer ID, the VIN and the like. When the engine ECU and the immobilizer ECU that are mounted in the same vehicle are determined to store the same vehicle identification information, the engine ECU determines that the engine ECU is not re-mounted in a different vehicle but is mounted in an original vehicle. Then, the engine ECU prohibits a change of the VIN. Accordingly, in a state where the engine ECU 10 is not re-mounted in a different vehicle but is mounted in an original vehicle, the improper change of the VIN can be prevented. As a result, the improper erasure of the malfunction information associated with the emission system along with the change of the VIN can be prevented.

When it is determined that the immobilizer IDs or the VINs do not match each other, the engine ECU 10 determines that the engine ECU 10 is detached from one vehicle and re-mounted in the different vehicle, and then the engine ECU 10 changes the VIN in accordance with the instruction for changing the VIN. Hence, the engine ECU 10 can change the VIN stored in the engine ECU 10 into an proper VIN that matches the different vehicle to which the engine ECU 10 is re-mounted.

(Modifications)

The above embodiments can be modified in various ways. Modification examples are described below.

In the above embodiments, the VIN is an example of stored information unique on the vehicle-by-vehicle basis. Further, the emission system malfunction information, the immobilizer ID and the learning data for vehicle control are respectively erased, changed and initialized when the VIN is changed. Alternatively, vehicle-by-vehicle basis unique information unique other than the above-described types of unique information may also be changed, erased or initialized as needed.

In the above embodiments, the immobilizer ID and the learning data are stored in the EEPROM 24, which is a non-volatile memory. Alternatively, for example, the immobilizer ID and the learning data may be stored in the SRAM 22 if the engine ECU 10 has a dedicated supplementary power supply for supplying electric power to the SRAM 22 even when the engine ECU 10 is detached from the vehicle 100. In the above, the dedicated supplementary power supply is provided separately from the battery of the vehicle.

In the above embodiments, the immobilizer ID functioning as second cross-check information is stored in the immobilizer ECU. Alternatively, the immobilizer ID may be stored in an ECU different from the immobilizer ECU. Alternatively, the immobilizer ID may not be stored in an ECU in a vehicle and may be stored in only such a portable device that a user of the vehicle can carry along. Such a portable device is a key for example.

In view of the above case, the above embodiments may be modified in the following ways. To change the immobilizer ID in a manner corresponding to S302 in FIG. 4, the engine ECU 10 may request an external element, such as an ECU different from the engine ECU 10 and a portable device, to transmit new immobilizer ID. When the engine ECU 10 does not receive the new immobilizer ID within a predetermined period after transmitting the request or does not receive the new immobilizer ID after transmitting multiple requests, the engine ECU 10 may write a predetermined value (e.g., an initial value) as temporal immobilizer ID. Then, when the next time the engine ECU 10 is activated, if the predetermined value is found to be stored as the temporal immobilizer ID, a process for writing the new immobilizer ID is performed.

Regarding S302, alternatively, the engine ECU 10 may change the immobilizer ID into a predetermined value in accordance with the above described manners while the engine ECU 10 is not in communication with the external element. Then, in the next activation, the engine ECU 10 requests the immobilizer ECU to transmit a new immobilizer ID and changes the immobilizer ID into the transmitted new immobilizer ID. Like the above manners, a time of changing the stored information unique on the vehicle-by-vehicle basis other than the VIN may be different from a time of changing the VIN as long as a the time different between the changes is within in an acceptable range that does not cause a practical difficulty.

In the first embodiment, the immobilizer ID is used as an example of cross-check information, which is unique on the vehicle-by-vehicle basis and different from the VIN. Alliteratively, information other than the immobilizer ID may be used as the cross-check information, which is unique on the vehicle-by-vehicle basis and different from the VIN.

In the above embodiments, the engine ECU 10 is an example of a subject ECU, which can be mounted in a vehicle and which stores therein the VIN and the first cross-check information. Alternatively, an ECU other than the engine ECU 10 may be used as the subject ECU. Similarly, an ECU other than the immobilizer ECU may be used as an external ECU, which stores therein the second cross-check information.

In the second embodiment, the engine ECU 10 and the immobilizer ECU 60 are used as examples of the ECUs that store information functioning as the VIN. Alternatively, ECUs other than the engine ECU 10 and the immobilizer ECU 60 may be used as the ECUs that store information functioning as the VIN.

In the above embodiments, a control program can allow the engine ECU 10 or the processing part 12 of the engine ECU 10 to function as a cross-check information acquisition means or section; a cross-check information determination means or section; a stored information management means or section; a vehicle identification information acquisition means or section; and a vehicle identification information determination means or section. Alternatively, one or some of hardware elements whose function is generally determined by a circuit configuration thereof may provide a part of or all of the above means or sections.

While the invention has been described above with reference to various embodiments thereof, it is to be understood that the invention is not limited to the above described embodiments and construction. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. An electronic control unit for a vehicle, comprising:
    a vehicle identification information storing part that stores therein vehicle identification information, which is unique on a vehicle-by-vehicle basis;
    a first cross-check information storing part that stores therein first cross-check information, which is unique on the vehicle-by-vehicle basis and different from the vehicle identification information;
    a second cross-check information acquisition section that acquires second cross-check information, which is unique on the vehicle-by-vehicle basis, different from the vehicle identification information and stored in an external electronic control unit that is mounted in a same vehicle as the electronic control unit is mounted in;
    a cross-check information determination section that determines whether the first cross-check information matches the second cross-check information; and
    a stored information management section that manages a change of the vehicle identification information stored in the vehicle identification information storing part upon receiving an instruction for changing the vehicle identification information, such that:
        the stored information management section prohibits the change of the vehicle identification information when the cross-check information determination section determines that the first cross-check information matches the second cross-check information; and
        the stored information management section changes the vehicle identification information when the cross-check information determination section determines that the first cross-check information does not match the second cross-check information.

2. The electronic control unit according to claim 1, further comprising:
    a malfunction information storing part that stores therein emission system malfunction information,
    wherein:
    the stored information management section erases the emission system malfunction information from the malfunction information storing part when the stored information management section changes the vehicle identification information; and
    the stored information management section prohibits an erasure of the emission system malfunction information from the malfunction information storing part when the stored information management section prohibits the change of the vehicle identification information.

3. The electronic control unit according to claim 1, wherein:
    the stored information management section prohibits a change of the first cross-check information stored in the first cross-check information storing part when the cross-check information determination section determines that the first cross-check information matches the second cross-check information.

4. The electronic control unit according to claim 1, wherein:
    each of the first cross-check information and the second cross-check information includes immobilizer identification information, which is unique on the vehicle-by-vehicle basis.

5. The electronic control unit according to claim 1, wherein:
    the stored information management section acquires the instruction for changing the vehicle identification information from an external apparatus by communicating with the external apparatus;
    when the stored information management section receives the instruction for changing the vehicle identification information, the cross-check information determination section makes a determination of whether the first cross-check information matches the second cross-check information while not communicating with the external apparatus; and
    the stored information management section manages the change of the vehicle identification information based on a result of the determination made by the cross-check information determination section while not communicating with the external apparatus.

6. The electronic control unit according to claim 1, wherein:

the stored information management section acquires the instruction for changing the vehicle identification information from an external apparatus by communicating with the external apparatus;

when the stored information management section receives the instruction for changing the vehicle identification information, the cross-check information determination section makes a determination of whether the first cross-check information matches the second cross-check information while communicating with the external apparatus; and the stored information management section manages the change of the vehicle identification information based on a result of the determination made by the cross-check information determination section while communicating with the external apparatus.

7. An electronic control unit for a vehicle, comprising:

a first vehicle identification information storing part that stores therein first vehicle identification information, which is unique on a vehicle-by-vehicle basis;

a second vehicle identification information acquisition section that acquires second vehicle identification information, which is unique on the vehicle-by-vehicle basis and stored in an external electronic control unit that is mounted in a same vehicle as the electronic control unit is mounted in;

a vehicle identification information determination section that determines whether the first vehicle identification information matches the second vehicle identification information; and a stored information management section that manages a change of the first vehicle identification information stored in the first vehicle identification information storing part upon receiving an instruction for changing the first vehicle identification information, such that:

the stored information management section prohibits the change of the first vehicle identification information when the vehicle identification information determination section determines that the first vehicle identification information matches the second vehicle identification information; and the stored information management section changes the first vehicle identification information when the vehicle identification information determination section determines that the first vehicle identification information does not match the second vehicle identification information.

* * * * *